United States Patent [19]

Mariaggi et al.

[11] Patent Number: 5,093,202

[45] Date of Patent: Mar. 3, 1992

[54] METHOD OF GLUING SUBSTRATES USING A COMPOSITION COMPRISING AN ARYLALIPHATIC COPOLYIMIDE WITH ETHER CHAIN FORMATIONS AND AN EPOXY RESIN

[75] Inventors: Paul Mariaggi, Seyssuel; Serge Gonzalez, Cité Berlier; Guy Rabilloud, Grenoble; Bernard Sillion, Lyon, all of France

[73] Assignee: Centre D'Etude Des Materiaux Organiques Pour Technologies Avancees, Vernaison, France

[21] Appl. No.: 561,999

[22] Filed: Aug. 2, 1990

Related U.S. Application Data

[62] Division of Ser. No. 945,988, Dec. 24, 1986, abandoned.

[30] Foreign Application Priority Data

Dec. 24, 1985 [FR] France ................................ 85 19277

[51] Int. Cl.$^5$ .......................... B32B 27/38; C09J 5/02
[52] U.S. Cl. ................................ 428/414; 156/330; 428/416; 525/423; 528/353
[58] Field of Search ..................... 156/330, 307.3; 525/423; 428/414, 416; 528/353

[56] References Cited

U.S. PATENT DOCUMENTS 4,098,628  7/1978  Walton ................................ 428/414

Primary Examiner—John J. Gallagher
Attorney, Agent, or Firm—Millen, White & Zelano

[57] ABSTRACT

Adhesive compositions are described comprising at least an arylaliphatic copolyimide with ether chain formations, obtained by the polycondensation reaction of a tetracarboxylic aromatic acid or of one of its derivatives with at least two primary diamines, one of these diamines consisting of a polyether chain ending with the two amine functional groups and at least an epoxy resin possessing more than one epoxy group per molecular.

These adhesive compositions can be used particularly for the gluing of films of polymers to thin metal sheets.

11 Claims, No Drawings

METHOD OF GLUING SUBSTRATES USING A COMPOSITION COMPRISING AN ARYLALIPHATIC COPOLYIMIDE WITH ETHER CHAIN FORMATIONS AND AN EPOXY RESIN

This is a division of application Ser. No. 06/945,988 filed Dec. 24, 1986, now abandoned.

BACKGROUND OF THE INVENTION

This invention has as its object new copolyimides with ether chain formations, and new adhesive compositions obtained by mixing or reaction of epoxy resins with said copolyimides with ether chain formations. The copolyimides, in addition to their utility as intermediates in the production of said compositions, themselves possess advantageous adhesive properties. Compositions obtained by mixing epoxy resins with said copolyimides are both thermoplastic and thermosetting, because the reactive functions of the epoxy resins induce crosslinking reactions at the moment the adhesive is used.

They further exhibit an entirely special solubility in numerous organic solvents, a very good resistance to heat and to oxidation and excellent adhesive properties.

The invention also relates to the use of these adhesive compositions as binders in the production of composite materials, such as insulating coatings, and such as adhesives for the gluing of metals or other materials. But because of their suppleness and their flexibility, they are particularly well suited for producing flexible composite materials. These materials can be obtained by gluing of films of organic polymers to one another or to thin metal sheets, or by gluing of films of polymers or of metal sheets to fabrics of organic or mineral fibers or further by gluing of metal sheets to one another.

It is known that the polyimides synthesized from aliphatic diamines as they have been described in U.S. Pat. Nos. 2,867,609, 2,880,230 and 2,944,993 are polymers generally having a thermoplastic nature, but requires relatively high temperatures, greater than 250° C. and often between 300° and 400° C. Moreover, it has been demonstrated in U.S. Pat. No. 4,277,993 that, generally, polyimides of high molecular weight do not react with epoxy resins.

It has also been shown in French patent 2,514,772 that adhesive compositions made of an aromatic polybenzhydrolimide resin and an epoxy resin could be used to produce composite materials. Said compositions, however, have too great a structural rigidity to be used in applications which require a supple, flexible and elastic adhesive.

It is also found that the polyimides of the prior art, i.e., made by the reaction of a derivative of a tetracarboxylic aromatic acid with a diprimary aliphatic diamine, have thermoplastic properties at high temperature, but that they are not sufficiently flexible for certain specific applications such as gluing of supple materials. As will be seen in the comparative examples, these polymers have, in comparison with supple substrates, too great a rigidity which induces high mechanical stresses in the material. Further, since their temperature of thermoplasticity is generally greater than 200° C., there are, at the moment the products are used, irreversible deformations of the substrates with large defects of surface evenness of the composite materials.

SUMMARY OF THE INVENTION

One of the objects of this invention is to prepare new compositions of arylaliphatic copolyimides having a relatively low temperature of thermoplasticity, generally less than 200° C., and preferably between 70° and 190° C.

Another object of the invention is to prepare adhesive compositions by mixing at least one copolyimide with at least one epoxy resin.

Another object of the invention relates to the reaction product of at least one of these copolyimides with at least one epoxy resin which can be obtained by heating of the mixture of the reagents at a temperature at least equal to their softening or melting temperature, which is for example between 100° and 300° C. The resins of copolyimides with ether chain formations of the invention actually exhibit the advantage on the one hand of being perfectly compatible with numerous commercial epoxy resins and on the other hand soluble in numerous organic solvents which are good solvents of epoxy resins. The conditions for using these copolyimide/epoxy resin adhesive compositions, i.e., the pressure and temperature necessary to perform the gluing of the surfaces, are greatly improved in relation to what is known for the polyimides of the prior art.

In particular, it was discovered that the adhesive compositions of the invention were very soluble in a large number of organic solvents which are not ordinarily solvents of polyimides. These compositions also have a very good stability in storage either in solution form, or in the form of adhesive film. Also, their properties of suppleness or rigidity can be very easily modified by acting on the chemical constituents of the composition. Another advantage of these adhesive compositions resides in their conditions of use which are virtually identical with those which are used with the epoxy resins.

Another object of the invention relates to the use of the adhesive compositions, made by the mixture or the reaction product of epoxy resins with the copolyimides with ether chain formations, to produce flexible composite materials. The production of these materials actually requires a certain number of entirely specific properties. In particular, the adhesive layer must remain supple and elastic during its use so that the material keeps a good surface evenness. At the same time, it must have good cohesive properties to prevent the sliding of the substrates in relation to one another. Finally, in the case of the gluing of the films of polymers to one another or to metal sheets, it is important not to have to perform prior physical or chemical treatment to the substrates to obtain good adhesive properties.

It was discovered that the adhesive compositions of the invention exhibited on all these points: solubility, setting at moderate temperature, surface evenness of the material, control of slide, absence of creep, gluing of untreated supports and strong adhesion, a set of entirely remarkable properties. Also, in applications intended for electronics where ionic purity is a very important factor, these compositions have the advantage of providing seals of glue which are barely permeable to the absorption of mineral ions during the chemical etching treatments.

More particularly, the invention has as its object compositions of copolyimides prepared by reacting least one primary diamine of general formula $$H_2N-R-NH_2 \quad (1)$$

and at least one primary diamine of general formula $$H_2N-R''_1-O-(-R'-O-)_n-R''_2-NH_2 \quad (2)$$

with at least an aromatic compound of general formula

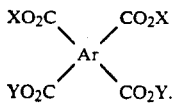
(3)

The diamine of formula (1) representing from 90 to 30% by mole and the diamine of formula (2) from 10 to 70% by mole of the total amount of the diamines.

In these formulas, R, R', R''$_1$ and R''$_2$ are divalent organic radicals whose two valences are on separate carbon atoms in the molecule. The R radical can be a hydrocarbon residue containing from 2 to 20 carbon atoms, consisting of a linear or branched aliphatic chain, of one or more saturated or unsaturated rings or also of an arylaliphatic chain. The R radical can, in addition to the carbon and hydrogen atoms, also contain heteroatoms such as for example oxygen, sulfur, nitrogen, phosphorous or silicon.

When the R radical is a carbocyclic or heterocyclic divalent aromatic radical, it can be formed from one ring or several rings which are then fused or connected to one another. When the R radical has several rings connected to one another, the linking elements are, for example, the simple bond or one of the following atoms and groups: —O—, —S—, —SO—, —SO$_2$—, —CH$_2$—, —CF$_2$—, —C(CH$_3$)$_2$—, —C(CF$_3$)$_2$—, —CO—, —CHOH—, —COO—, CONH—, —Si(CH$_3$)$_2$—, —Si(CH$_3$)$_2$—O—Si(CH$_3$)$_2$—.

n can be zero or a whole number, for example from 1 to 100.

The Ar radical is a carbocyclic or heterocyclic tetravalent aromatic radical whose four valences are on separate carbon atoms located two by two in ortho position in relation to one another. The Ar radial can be formed from one ring or from several rings which are then fused or connected to one another. When the Ar radical has several rings connected to one another, the linking elements are, for example, the simple bond or one of the atoms and groups defined above for the R radical.

X and Y, identical or different, can be monovalent radicals of hydrocarbons each preferably containing from 1 to 13 carbon atoms, for example lower alkyls containing from 1 to 13 carbon atoms, cycloalkyls or aryls containing from 6 to 13 carbon atoms. In this case, the compounds of formula (3) are tetraesters of tetracarboxylic aromatic acids. The X radical can also represent a hydrogen atom, Y being defined as above, and the compounds of formula (3) then represent bis(orthoacid-esters) of tetracarboxylic aromatic acids. The X and Y radicals can also both be hydrogen atoms and in this case the compounds of formula (3) represent tetracarboxylic aromatic acids.

Of the primary diamines of general formula (1) which are suitable for this invention, there can be cited 1,3-diaminopropane, 1,4-diaminobutane, 1,3-diamino 2,2-dimethyl propane, 1,3-diamino 1,1,3-trimethyl propane, 1,5-diamino pentane, 1,5-diamino 3,3-dimethyl pentane, 1,6-diaminohexane, 1,6-diamino 3-methyl hexane, 1,6-diamino 2,5-dimethyl hexane, 2,2,4- and 2,4,4-trimethyl hexamethylenediamines or the mixture of these two isomers, 1,1,6,6- and 2,2,5,5-tetramethylhexamethylenediamines, ter-butyl hexamethylene diamine, 1,7-diaminoheptane, 1,7-diamino 3-methylheptane, 2,5-and 4,4-dimethylheptamethylenediamines, 1,8-diaminooctane, 1,9-diaminononane, 1,9-diamino 5-methyl nonane, 1,10-diaminodecane, 1,11-diaminoundecane, 1,12- and 2,11-diaminododecanes, 2,17-diaminoeicosadecane, bis(3-aminopropyl) sulfide, 1,3 and 1,4-diaminocyclohexanes, bis(4-aminocyclohexyl) methane, meta and para-xylylenediamines, isophoronediamine, 1,3- and 1,4-diaminobenzenes, 3,3'- and 4,4'-diamino diphenylmethanes, 3,3'-and 4,4'-diamino diphenylethers, 3,3'- and 4,4'-diamino diphenylsulfides, 3,3'- and 4,4'-diamino diphenyl sulfones, benzidine, 3,3'-dimethylbenzidine, 3,3' and 4,4'-diamino benzophenones and 3,3'- and 4,4'-diamino benzhydrols.

Of the primary diamines of general formula (2) which are suitable for this invention, there can be cited bis(3-aminopropyl) ether, 1,2-bis(3-aminopropoxy) ethane, 1,12-diamino 4,9-dioxadodecane, 1,3-diamino 4,7,10-trioxatridecane, bis(3-aminopropyl) polyoxytetramethylene of average molecular weight between 350 and 2500, 1,3-bis(4-aminophenoxy) propane, bis(3-aminopropyl) polyoxyethylene of average molecular weight between 300 and 3000, bis(3-aminopropyl) copolyoxyethylene-oxypropylene of average molecular weight between 300 and 3000 and all the polyethers terminated by primary amine groups whose average molecular weight is between 250 and 3000.

Of the compounds of formula (3), there can be cited the tetracarboxylic aromatic acids, their symmetrical tetraesters, such as the esters of tetramethyl, tetraethyl, tetraisopropyl and tetraphenyl, their dissymmetrical tetraesters such as the esters of dimethyl diphenyl, diethyl diphenyl, dimethyl dibutyl, their bis(ortho-acid esters), more simply called diesters such as for example, the methyl diester, the ethyl diester, the n-propyl diester, the isopropyl diester, the n-butyl diester, the isobutyl diester, the amyl diester, the hexyl diester, the phenyl diester, the 2-hydroxyethyl diester, the trifluoroethyl diester, and the ethoxycarbonylmethyl diester.

Of the tetracarboxylic acids and their derivatives which are suitable for this invention, there can be cited benzene 1,2,4,5-tetracarboxylic acid, biphenyl 3,3',4,4'-tetracarboxylic acid, benzophenone 3,3',4,4'-tetracarboxylic acid, benzhydrol 3,3',4,4'-tetracarboxylic acid, diphenylsulfide 3,3',4,4'- tetracarboxylic acid, diphenylsulfone 3,3',4,4'-tetracarboxylic acid, diphenylether 3,3',4,4'-tetracarboxylic acid, diphenylmethane 3,3',4,4'-tetracarboxylic acid and 2,2-bis(3,4-dicarboxypehnyl) 1,1,1,3,3,3-hexafluoropropane. The acids or the esters of the benzhydrol and benzophenone tetracarboxylic acids are preferred.

In the preferred method of use of the invention, an adhesive composition consisting mainly of a copolyimide resin is prepared by dissolving in an appropriate solvent one or more diamines of formula (1) and one or more diamines of formula (2), with a preferably approximately equimolar quantity of at least one aromatic compound of formula (3).

It is naturally the stoichiometric proportions, as in any polycondensation reaction, that give the polymers of higher molecular weight, but for certain applications, it is possible to employ an excess of one or the other of the monomers. However, it is preferable that the deviation in relation to the stoichiometric proportions be less than 25% and preferably between 0 and 15% by mole. The stoichiometric proportions correspond to an equal number of antagonistic reactive functions, these functions being the primary amine groups coming from the compounds of general formulas (1) and (2) and the diacid or diester or acid-ester ortho groups provided by the compounds of general formula (3).

The preferred solvents with which the compositions of copolyimides of the invention are prepared are polar organic compounds, i.e., containing a heteroatom such as oxygen, nitrogen, sulfur, phosphorous or chlorine, inert in regard to the monomers and polymers. Of these solvents there can be cited phenols such as phenol, cresols, xylenols, chlorophenols; mono- or di-ethers of glycols such as for example those of ethyleneglycol and diethyleneglycol, mono or diesters of glycols, such as for example those of ethyleneglycol and diethyleneglycol; amides such as for example methylformamide, dimethylformamide, dimethylacetamide, methylacetamide, hexamethylphosphotriamide; ureas, such as for example tetramethylurea; heterocyclic compounds such as for example pyridine, quinoline, dioxane, tetrahydrafuran, N-methylpyrrolidone, N-acetylpyrrolidone, N-cyclohexyl pyrrolidone, tetramethylenesulfone; sulfones and sulfoxides, such as for example dimethylsulfone and dimethylsulfoxide.

These solvents can be used alone or mixed with one another, or further in mixture with other liquid organic compounds of which there can be cited alcohols such as methanol, ethanol, propanol, isopropanol, butanols, benzylic alcohol; ketones, such as for example acetone, 2-butanone, methylisobutyl ketone, diisopropyl ketone, cyclohexanone, acetophenone; aromatic hydrocarbons, such as benzene, toluene, xylenes, naphtha solvent; halogenated hydrocarbons, such as chlorobenzene, dichlorobenzenes, chlorotoluenes; aliphatic and aromatic esters of the aliphatic and aromatic carboxylic acids, such as for example acetates of methyl, ethyl, isopropyl, butyl, phenyl, methyl and phenyl benzoates; ethers such as dibutyl or diphenyl ether.

The initial concentration of the monomers in the reaction solvent is not critical, but it is generally between 10 and 80% by weight. At the end of the reaction, the concentration of the resinous composition is adjusted to a value so that the solution has a dynamic viscosity well suited to the envisaged use. In other words, the final concentration depends on the molecular weight of the polymer, on the nature of the solvent or solvents and on the temperature of use.

For applications where it is necessary to modify either the composition of the solvents, or the final composition of the products, it is preferable to precipitate the compositions of copolyimides of the invention in a liquid medium which is a nonsolvent of the polymers but preferably miscible with the polymerization solvent, such as for example water, water-alcohol solutions, certain ketones, certain ethers, certain aliphatic hydrocarbons.

The temperature of the polycondensation reaction can vary in a very wide range, between 80° and 400° C. It is generally fixed at a value so that the reaction of the amine functions on the acid or ester functional groups is performed at a reasonable speed. Depending on the solvent and the reagents used, a temperature between 100° and 250° C. generally gives good results. The volatile products, water and/or alcohols, formed during the reaction, can be left in the medium, but they can also be eliminated by distillation as they are formed which makes it possible to control the extent of the reaction.

The extent of a polycondensation reaction by definition is the ratio between the number of functional groups having reacted and the initial number of these same groups. It can be defined as a percentage (and the disappearance of half of the reactive functions corresponds to an extent of for example 50%) or as a rate of reaction (p), such that p is between 0 and 1. In this case, an extent of 50% has for equivalent a reaction rate of 0.5. By definition, the degree of polycondensation or DP is given by the relation 1/1-p.

During the polycondensation, the two amines of formulas (1) and (2) can be placed simultaneously in reaction or they can be introduced successively.

The compositions of copolyimides of the invention exhibit a particularly high solubility in numerous organic solvents. Consequently, it is possible to follow easily the formation of polymers by the usual analysis techniques. The extent of the reaction can be determined simply by measuring the amount of volatile products which distill during the reaction. The metering of the amine, acid and/or ester functions which constitute the ends of chains can also be advantageously used. The solubility of polymers also makes it possible to employ all the methods of spectroscopic analysis (infrared, ultraviolet, nuclear magnetic resonance) to study the structure of the polymers.

The preparation process of the compositions of copolyimides makes it possible to determine the extent of the reaction by measuring the weight of distillate (water and/or alcohol). Further, in the case for example of the alkyl diesters of the tetracarboxylic acids, the composition of the distillate provides data on the rate of ring formation in of the imide. Actually, the reaction of an amine function on an acid-ester group produces a molecular equivalent of water and a molecular equivalent of alcohol each time there is formation of an imide ring. It has thus been observed that the compositions of the invention have an imidation degree always greater than 90% and generally between 95 and 99.9%. This means that, for example, 95 to 99.9% of the amine functions having reacted are engaged in imide rings, the residue being in all likelihood in amide-acid and/or amide ester form.

The compositions of the invention are prepared, at various degrees of completion of the reaction, for example from 50 to 99.9%, as a function of the use to which they are intended. For most applications, however it is preferable to prolong the reaction until its extent of completion is between 90 and 99.9%, so as to eliminate the majority of the volatile compounds before using the polymers. A high conversion rate further exhibits the advantage of leaving in the medium only extremely small quantities by weight of starting monomers.

The copolyimides according to this invention, as defined above, can optionally be used directly in this form for a certain number of applications. But it is preferable to use them in mixture or in combination with other resins such as epoxy resins since the envisaged application requires the use of a thermoplastic adhesive that can be crosslinked at a moderate temperature for example from 50° to 250° C., preferably from 100° to 200° C. For this use, copolyimides are preferred with an inherent viscosity of 0.2 to 0.8 dl/g, measured at 30° C. for a concentration of 5 g of polymer per liter of N-methylpyrrolidone.

By epoxy resin is meant any compound possessing more than one epoxy group per molecule. Of the epoxy resins which can be employed in this invention, there can be cited the resins prepared by reaction of glycerol epichlorohydrin or dichlorohydrin with polycarboxylic acids, polyols, polyphenols, aminophenols, amines or various heterocyclic compounds.

Of the glycidic esters, there can be cited esters derived from aliphatic polycarboxylic acids such as oxalic, succinic, glutaric, adipic, pimelic, suberic, azelaic, sebacic or linoleic acids; esters derived from cycloaliphatic polycarboxylic acids such as tetrahydrophthalic, methyl tetrahydrophthalic, hexahydrophthalic, methyl hexahydrophthalic, nadic, or methyl nadic acids; esters derived from polycarboxylic aromatic acids such as for example, phthalic, isophthalic, terephthalic or trimellitic acids.

Of the glycidic ethers, there can be cited ethers derived from polyols such as ethylene glycol, di- and tri-ethylene glycols, higher polyoxyethylene glycols, 1,2- and 1,3-propanediols, polyoxypropylene glycols, 1,4-butanediol, polyoxybutylene glycols, 1,5-pentanediol, 1,6-hexanediol, glycerol, 1,1,1-trimethylolpropane, neopentyl glycol, pentaerythritol; ethers derived from cycloaliphatic polyols such as resorcitol, quinitol, bis(4-hydroxycyclohexyl) methane, 2,2-bis (4-hydroxycyclohexyl) propane and ethers derived from polyphenols such as resorcinol, hydroquinone, bis(4-hydroxyphenyl) methane, 2,2-bis(4-hydroxyphenyl) propane, bis(4-hydroxyphenyl) sulfone, 1,1,2,2-tetrakis(4-hydroxyphenyl) ethane, 2,2-bis(3,5-dibromo 4-hydroxyphenyl) propane and the novolak resins formed from the condensation reaction of aldehydes and ketones with the phenols.

Of the glycidylamines, there can be cited those that are formed from aniline, butylamine, bis(4-aminophenyl) methane, 1,3-and 1,4-diaminobenzene, meta- and para-xylylenediamines and meta- and para-amino phenols.

In addition to these glycidic compounds, there can be used epoxy resins prepared by epoxidation of compounds having one or more ethylene double bonds such as for example, vinyl cyclohexene, dicyclopentadiene, cyclohexadiene, isoprene, butadiene, divinyl benzene, esters derived from unsaturated acids such as carboxylic cyclohexene acid and, in a general way, the resins known under the name of cycloaliphatic resins.

To glue two substrates to one another, a layer of a mixture of copolyimide and epoxy resin is applied between the two substrates and contact is maintained while heating to a temperature of 50° to 250° C., preferably 100° to 200° C. For one hundred parts by weight of copolyimides, from 1 to 30 parts by weight of epoxy resin is advantageously used. Although the mechanism of the reaction is not totally explained, it is thought that the epoxy groups react with the starting reaction groups which have not reacted or with amide groups formed intermediately between the acid compound and the primary diamine. These groups are almost always present, at least in small proportion, even when stoichiometric proportions of reagents have been used to form the copolyimide.

The invention will be described more precisely in conjunction with the specific examples below in which the details are given in a nonlimiting and illustrative way. In these examples, the polycondensation reactions are performed under agitation and in an inert atmosphere to avoid the oxidation of the amine functions.

The inherent viscosities, when given, are measured at 30° C. for a concentration of 5 g of polymer per liter of N-methyl pyrrolidone.

The softening temperature of the polymers, when it is indicated, is measured on the Kofler hot bench by spreading the polymer over the entire length of the bench. After about 1.5 minutes, the polymer is swept with a brush and the thermal anchoring zone on the bench serves as a reference as softening temperature.

The presence of the cyclic imide chain formations in the soluble polymers obtained when the operation is as described in the examples according to the invention, has been determined by standard analysis methods: elemental analysis, reaction with hydrazine hydrate and sodium hydroxide, spectrography in infrared and ultraviolet, nuclear magnetic resonance of protons and of carbon and thermal analyses.

The epoxy resins cited more particularly in the examples are:

The Epon 827 and Epon 1001 (trademark of the Shell company) resins which are bisphenol-A diglycidyl ethers having respectively an epoxy equivalent weight of 19 and 450 g.

The DEN 438 (trademark of the Dow Chemical Company) epoxynovolak resin.

1-(N,N-bis(1,2-epoxypropyl) amino) 4-(1,2-epoxypropyloxy) benzene or N,N,O-triglycidyl para-aminophenol (TGAP).

bis(N,N-bis(1,2-epoxypropyl) 4-aminophenyl) methane or N,N,N',N'-tetraglycidyl methylene dianiline (TGMDA).

The substrates used to produce the materials cited by way of examples are as follows.

Untreated films of Kapton (trademark of DuPont de Nemours) polyimide (produced from pyromellitic anhydride and 4,4'-exydianiline) in thicknesses of 50, 100 and 150 micrometers.

Electrodeposited or rolled copper sheet oxidized on one face 50 to 100 micrometers thick.

Aluminum sheet 50 to 100 micrometers thick.

Test pieces of 2024 T3 aluminum alloy.

E1581 glass fabric treated with an aminopropyl triethoxy silane finish and weighing about 300 g/m$^2$.

The values of mechanical strength of the materials, when they are given, have been measured with an Instron 1175 (trademark) universal test machine equipped to determine the tensile-shearing stress, the bending strength and the resistance to peeling on German wheel with an angle of traction of 90°.

Examples 1 to 4 are given by way of comparison. In these examples, resins of polyimides are synthesized by using separately either a diamine of general formula (1), or a diamine of general formula (2). These resins therefore each contain one of the elements constituting the basic structure of the arylaliphatic copolyimides of the invention.

The adhesive compositions prepared from the resins of polyimides of examples 1 to 4 and from an epoxy resin are described in comparative examples 22 to 25. In examples 46 to 49 and in example 55 which are also given by way of comparison, the synthesized polymers in examples 1 to 4 are used as adhesives to produce composite materials. The other examples illustrate various methods of using the invention.

PREPARATION OF POLYIMIDES

Example 1 (comparative)

A mixture of 466 g (1.2 mole) of methyl diester of benzhydrol 3,3',4,4'-tetracarboxylic acid, 189.95 g (1.2 mole) of a commercial mixture of 2,2,4-trimethyl and 2,4,4-trimethylhexamethylenediamine and 607 g of N-methyl pyrrolidone is heated first at 160° C., then at 180° C. and finally at 200° C. The period of the reaction is 30 minutes at the first two temperatures and one hour at the last. At each stage, a portion of the solution is precipitated and washed in water to give three resins of polyimides whose inherent viscosities are respectively 0.21, 0.37 at 0.88 dl/g with, for each of them, a softening temperature near 190° C.

The precipitation of the polymer in water is performed by using an impeller mixer rotating at very high speed. The solid polymer is washed and ground three times thereafter in distilled water. After filtration, it is dried to constant weight, under reduced pressure, in an oven heated to 100°-110° C.

Thermogravimetric analysis shows that this polymer has a decomposition temperature greater than 300° C. Further, when it is heated in air for 500 hours at 200° C., the weight loss is less than 2%.

Examples 2 to 4 (comparative)

A series of compositions of polyimides is prepared by causing the methyl diester of benzhydrol 3,3',4,4'-tetracarboxylic acid and three different bis(3-aminopropyl) polyoxytetramethylenes, each in solution in 30 g of N-methyl pyrrolidone, to react for one hour at 200° C. with the proportions of reagents indicated in table 1.

TABLE 1

| Example No. | Diester (Moles) | Diamine[a] (Moles) | Inherent viscosity | Tr[b] (°C.) |
|---|---|---|---|---|
| 2 | 0.081 | 0.08 | 0.27 | 65 |
| 3 | 0.0707 | 0.066 | 0.20 | 50 |
| 4 | 0.05 | 0.05 | 0.38 | 20 |

[a] The average molecular weight by number of these diamines is 860, 1250 and 2150 respectively for examples 2, 3 and 4.
[b] Softening temperature.

Examples 5 to 7

A mixture consisting of methyl diester of benzhydrol 3,3',4,4'-tetracarboxylic acid (38.83 g; 0.1 mole) of the molar amount of a commercial mixture of 2,2,4-trimethyl and 2,4,4-trimethylhexamethylenediamine indicated in table 2 (Diamine 1) and 50 to 70 g of N-methyl pyrrolidone is heated in 10 minutes to 100°-110° C., then left at this temperature for 15 minutes. After cooling to ambient temperature, the molar amount of bis(3-aminopropyl) polyoxytetramethylene of molecular weight 860 indicated in table 2 (Diamine 2) is added to the reaction mixture. The whole is then heated for 30 minutes at 160° C., 2 hours at 180° C. and 1 hour at 200° C.

A portion of the solution is precipitated in water and treated as indicated in example 1.

TABLE 2

| Example No | Diamine 1 (Moles) | Diamine 2 (Moles) | Inherent viscosity |
|---|---|---|---|
| 5 | 0.08 | 0.02 | 0.35 |
| 6 | 0.07 | 0.03 | 0.295 |
| 7 | 0.06 | 0.04 | 0.52 |

These resins have a softening temperature which varies from 90° to 125° C. and a thermal stability identical with that of the polymer of example 1.

Examples 8 to 10

In these examples, the solvent, the diester and diamine 1 are the same products as in examples 5 to 7 but diamine 2 is a bis(3-aminopropyl) polyoxytetramethylene of average molecular weight equal to 1250. The composition of the reaction mixtures and the inherent viscosity of the copolymers are given in table 3.

TABLE 3

| Example No | Diamine 1 (Moles) | Diamine 2 (Moles) | Inherent viscosity |
|---|---|---|---|
| 8 | 0.09 | 0.01 | 0.43 |
| 9 | 0.08 | 0.02 | 0.39 |
| 10 | 0.07 | 0.03 | 0.35 |

These resins have a softening temperature which varies between 80° and 110° C. and an excellent thermal stability.

Example 11

A methyl diester mixture of benzhydrol 3,3',4,4'-tetracarboxylic acid (38.83 g; 0.1 mole) of 1,13-diamino 4,7,10-trioxatridecane (17.62 g; 0.08 mole) and N-methyl pyrrolidone (42 g) is heated at 160° C. for 1.5 hours. After addition of 3.01 g (0.015 mole) of 1,12-diamino dodecane, the solution is heated for 30 minutes at 160° C., 30 minutes at 180° C. and 45 minutes at 200° C.

The copolymer precipitated in water has an inherent viscosity of 0.43 dl/g and a softening temperature of 122° C.

Example 12

A mixture of 180 g of dianhydride of benzophenone 3,3',4,4'-tetracarboxylic acid (BTDA), 40 g of methanol anhydride and 110 g of N-methyl pyrrolidone (NMP) is heated for an hour at 60° C. to prepare the corresponding methyl diester.

After cooling, there are added 67 g of trimethyl hexamethylenediamine (TMHMDA) (mixture of isomers 2,2,4 and 2,4,4), 91.8 g of bis(3-aminopropyl) polyoxytetramethylene of average molecular weight equal to 860 and 100 g of N-methyl pyrrolidone. The polycondensation reaction is performed for 30 minutes at 160° C., 2 hours at 180° C. and 1 hour at 200° C.

The polyimide composition obtained by precipitation in water has an inherent viscosity of 0.33 dl/g and a softening temperature of 135° C.

Examples 13 and 14

Two compositions of copolyimides are prepared under the experimental conditions of example 12 by using the same dianhydride (BTDA), methanol, N-methyl pyrrolidone (NMP), trimethyl hexamethylenediamine (TMHMDA) and a bis(3-aminopropyl) polyoxytetramethylene of average molecular weight equal to 1250.

The weights in grams of reagents and the characteristics of the copolyimides are indicated in table 4.

TABLE 4

| Chemical compounds | Example 13 | Example 14 |
|---|---|---|
| Dianhydride (BTDA) | 345 | 220 |
| Methanol | 75 | 40 |

TABLE 4-continued

| Chemical compounds | Example 13 | Example 14 |
|---|---|---|
| Solvent (NMP) | 416 | 210 |
| Diamine 1 (TMHMDA) | 127 | 93 |
| Diamine 2 (polyether) | 225 | 73.7 |
| Inherent viscosity (dl/g) | 0.27 | 0.31 |
| Softening temperature (°C.) | 115 | 130 |

Examples 15 and 16

Two compositions of arylaliphatic copolyimides are prepared by causing to react for 30 minutes at 160° C., 2 hours at 180° C. and hour at 200° C. a mixture consisting of methyl diester of benzhydrol 3,3',4,4'-tetracarboxylic acid (BHTDE), of bis(4-aminophenyl) methane (MDA: Diamine 1), N-methyl pyrrolidone and bis(3-aminopropyl) polyoxytetramethylene of molecular weight 1250 (Diamine 2) whose amounts in grams are given in table 5.

TABLE 5

| Chemical compounds | Example 15 | Example 16 |
|---|---|---|
| Diester (BHTDE) | 260 | 360 |
| Solvent (NMP) | 117 | 120 |
| Diamine 1 (MDA) | 88 | 100 |
| Diamine 2 (polyether) | 210 | 398 |
| Inherent viscosity (dl/g) | 0.37 | 0.38 |
| Softening temperature (°C.) | 245 | 190 |

Example 17

By following the protocol of example 5, there is made to react the methyl diester of benzhydrol 3,3',4,4'-tetracarboxylic acid (194.165 g; 0.7 mole), trimethyl hexamethylenediamine (111.23 g; 0.7 mole), the methyl diester of benzophenone 3,3',4,4'-tetracarboxylic acid (193.15 g; 0.5 mole) and 375 g (0.3 mole) of bis(3-aminopropyl) polyoxytetramethylene of average molecular weight equal to 1250 in 750 g of N-methyl pyrrolidone.

A portion of the solution is precipitated in water to give a copolymer having an inherent viscosity of 0.62 dl/g and a softening temperature of 145° C.

Example 18

A copolyimide composition is prepared by causing to react 303 g of methyl diester of benzene 1,2,4,5-tetracarboxylic acid and 225 g of bis(3-aminopropyl) polyoxytetramethylene of molecular weight 1250 in 260 g of N-methyl pyrrolidone for 30 minutes at 160° C. and one hour at 180° C. After addition of 126.8 g of trimethyl hexamethylenediamine, the heating is continued for 30 minutes at 160° C., one hour at 180° C. and one hour at 200° C. The copolymer precipitated in water has an inherent viscosity of 0.22 dl/g and a softening temperature of 165° C.

Example 19

A copolyimide composition is prepared by causing to react at 180° C. 2 hours the methyl diester of benzhydrol 3,3',4,4'-tetracarboxylic acid (31.07 g; 0.08 mole), benzhydrol tetracarboxylic acid (7.205 g; 0.02 mole), bis(4-aminophenyl) methane (3.96 g; 0.02 mole) and a diamino-polyoxypropylene of molecular weight 990 (77.2 g; 0.078 mole) in solution in 70 g of m-cresol.

After an additional heating at 200° C. for 1 hour, the copolymer is isolated by precipitation in methanol. It has an inherent viscosity of 0.36 dl/g and a softening temperature of 148° C.

Example 20

A copolyimide composition is prepared by causing to react for 4 hours at 200° C. in 80 g of meta cresol a mixture of benzhydrol 3,3',4,4'-tetracarboxylic acid (36 g; 0.1 mole), 5-amino 1,3,3-trimethyl 1-aminomethyl cyclohexane (8.52 g; 0.05 mole), 1,12-diamino 4,9-dioxadodecane (6.13 g; 0.03 mole) and 10.44 g (0.018 mole) of diamino copolyoxyethylene-oxypropylene having an average molecular weight of 580.

At the end of the reaction, the polymer is precipitated in methanol, washed three times with methanol with boiling and dried at 100° C. under vacuum for 24 hours. Its inherent viscosity is 0.7 dl/g.

Example 21

There is made to react a mixture of 42 g (0.1 mole) of methyl tetraester of benzhydrol 3,3',4,4'-tetracarboxylic acid, 6.31 g (0.03 mole) of bis(4-aminocyclohexyl) methane, 4.09 g (0.02 mole) of 1,12-diamino 4,9-dioxadodecane and 32.5 g (0.05 mole) of diamino polyoxybutylene having an average molecular weight of 650 in 50 g of N-cyclohexyl pyrrolidone at 200° C. for five hours to prepare a composition of copolyimides having an inherent viscosity of 0.46 dl/g.

PREPARATION OF ADHESIVE COMPOSITIONS

Example 22 (comparative)

An adhesive composition is prepared by dissolving 148.5 g of polyimide resin of example 1 and 16.5 g of epoxy resin (Epon 827) in 264 g of dioxane. The mixture is then diluted with 396 g of acetone to have a concentration of dry matter near 20% by weight.

The dynamic viscosity of this solution is 330 mPa.s.

Examples 23 to 25 (comparative)

Three adhesive compositions are prepared by dissolving 20 g of each of the polymers prepared in examples 2 to 4 and 2 g of epoxy resin (Epon 827) in 80 g of a mixture consisting of 70% by weight of dichloromethane, 10% 2-butanone, 10% xylene and 10% hexane.

Examples 26 and 27

Two adhesive compositions are prepared from the copolymers of examples 6 and 7 by using the proportions by weight of reagents and of solvents indicated below.

| | Example 26 | Example 27 |
|---|---|---|
| Resin of example 6 | 100 | |
| Resin of example 7 | | 100 |
| Epoxy resin (Epon 827) | 11 | 10 |
| Octyl epoxystearate | 10 | |
| 2-Tetrahydrofuranone | 20 | 20 |
| Dichloromethane | 250 | 260 |
| Xylene | 30 | 100 |
| Hexane | 10 | 30 |

These adhesive compositions can be kept at ambient temperature before use for several weeks without gelation reactions or a variation of their dynamic viscosity being able to be observed.

Examples 28 and 29

Two adhesive compositions are prepared from the copolymers of examples 9 and 10 by using the following proportions by weight.

|  | Example 28 | Example 29 |
|---|---|---|
| Resin of example 9 | 165.4 |  |
| Resin of example 10 |  | 50 |
| Epoxy resin (Epon 827) | 18.9 | 2 |
| Octyl epoxystearate | 16.6 |  |
| 2-Tetrahydrofuranone | 33.1 |  |
| Dichloromethane | 430 |  |
| Xylene | 165.4 |  |
| Hexane | 49.6 |  |
| Tetrahydrofuran |  | 150 |

These adhesive compositions can be kept at ambient temperature before use for several weeks without gelation reactions or a variation of their dynamic viscosity being able to be observed.

Example 30

An adhesive composition is prepared by dissolving 100 g of copolyimide resin of example 12 and 3 g of epoxy resin (epoxy-novolak DEN 438) in a mixture of dichloromethane (260 g), tetrahydrofuranone (20 g), xylene (100 g) and hexane (30 g).

Examples 31 and 32

Two adhesive compositions are prepared from the copolymers of examples 13 and 14 by using the following proportions by weight.

|  | Example 31 | Example 32 |
|---|---|---|
| Resin of example 13 | 200 |  |
| Resin of example 14 |  | 202 |
| Epoxy resin (TGAP) | 2.5 | 2.5 |
| Dichloromethane | 520 | 464 |
| Xylene | 200 | 201.6 |
| Hexane |  | 123 |
| Methanol | 5 |  |

These adhesive compositions can be kept at ambient temperature before use for 1 to 2 weeks without gelation reactions or a variation of their dynamic viscosity being able to be observed.

Examples 33 and 34

Two adhesive compositions are prepared from the copolymers of examples 15 and 16 by using the following proportions by weight.

|  | Example 33 | Example 34 |
|---|---|---|
| Resin of example 15 | 50 |  |
| Resin of example 16 |  | 50 |
| Epoxy resin (TGMDA) | 2.5 | 2.5 |
| Dichloromethane | 170 | 165 |
| Xylene | 30 | 45 |

These adhesive compositions can be kept at ambient temperature before use for at least a week without gelation reactions or a variation of their dynamic viscosity being able to be observed.

Example 35

An adhesive composition is prepared with 100 g of copolyimide of example 17, 2.5 g of Epon 827 resin, 0.5 g of Epon 1001 resin, 2 g of TGAP epoxy resin, 250 g of dichloromethane, 90 g of xylene and 30 g of hexane.

USE OF THE ADHESIVE COMPOSITIONS

Examples 36 to 45

These examples demonstrate the use of the adhesive compositions of the invention to produce flexible composite materials consisting of a copper sheet, an adhesive layer and a Kapton polyimide film assembled by gluing.

A solution of the adhesive composition is deposited on a Kapton polyimide film 125 micrometers thick using a filmograph having an opening of 100 micrometers. The adhesive film is dried in the oven for 1 to 2 minutes at 80° C. The adhesive polyimide film is then glued to a copper sheet 100 micrometers thick by passing of two substrates between two rollers heated to 160°-170° C., with a linear speed of two meters per minute. The pressure exerted by the rollers is on the order of 1.5 to 2 MPa. The composite material is annealed in an oven for 3 to 4 hours between 160° and 170° C.

The adhesion force between the copper sheet and the Kapton film is measured by peeling on German wheel with a traction angle of 90°.

The measurement of the slide of the substrates in relation to one another is performed on samples of composite material prepared with test pieces 10 cm long and 2.3 cm wide having a covering surface of 5 cm by 2.3 cm. This assembly is placed in a programmed oven for a rise in temperature of 1° C. per minute. It is fastened to the top by a clamp tightened on the Kapton and a weight of 100 g or 300 g is attached to the copper sheet. The temperature of the oven is brought to 150° C. and the value of the slide is given by the movement of the two substrates in relation to one another at the end of this heat treatment.

The surface evenness of the assembly is determined by placing the composite material on a perfectly plane surface and by measuring the dip between the edges and the center of the material.

The appearance of the seal of glue, i.e., its homogeneity, the absence of bubbles or defects and the magnitude of the creep of the resin is determined by visual examination or by microscope.

The results obtained with the adhesive compositions of examples 26 to 35 are gathered in table 6.

TABLE 6

| Example No. | Composition of example No. | Resistance to peeling (daN/cm) |
|---|---|---|
| 36 | 26 | 1.8 |
| 37 | 27 | 1.7 |
| 38 | 28 | 1.9 |
| 39 | 29 | 1.8 |
| 40 | 30 | 1.7 |
| 41 | 31 | 2.2 |
| 42 | 32 | 2.0 |
| 43 | 33 | 2.4 |
| 44 | 34 | 2.2 |
| 45 | 35 | 1.9 |

All these materials exhibit an excellent appearance at the level of the adhesive layer and a very good surface evenness with a dip less than 0.5 mm. The sliding varies from 1 to 10 mm when the co-reagent is a difunctional epoxy resin (Epon 827). It is on the order of several micrometers with the tri or tetrafunctional epoxy resins (TGAP and TGMDA).

Examples 46 to 49 (comparatives)

The production of Kapton/copper flexible composite materials is performed as in the preceding examples by using the adhesive compositions of examples 22 to 25 prepared from the homopolymers described in examples 1 to 4. The results obtained with these products are given in table 7.

TABLE 7

| Example No. | Composition of example No. | Resistance to peeling (daN/cm) |
|---|---|---|
| 46 | 22 | 1.3 |
| 47 | 23 | 0.7 |
| 48 | 24 | 0.5 |
| 49 | 25 | 0.2 |

The adhesive compositions of examples 23 to 25 give plane gluings free of defect but the slide is 100%, i.e., the two substrates separate completely during this test. With the composition of example 22, the slide is 3 mm but the glue seal is not homogeneous with numerous bubbles and irregular areas of creep. Also, the material is greatly curved (poor surface evenness). The polyimide which constitutes the base of the adhesive is too rigid for this type of application.

Examples 50 and 51

The technique of the preceding examples is used to glue two films of polyimides (Kapton 50 micrometers thick) to one another with the adhesive compositions of examples 32 and 33. The resistance to peeling of these assemblies is excellent because the polyimide film is torn before there is a break at the level of the glue seal.

Example 52

A flexible composite material is produced according to the process of the preceding examples by gluing to the two faces a Kapton film 100 micrometers thick with the adhesive composition of example 29. This film is then rolled between rollers with two aluminum sheets 100 micrometers thick. The resistance to peeling of the adhesive seal is 2 daN/cm.

Example 53

A flexible composite material is produced by depositing on E 1581 glass fabric the adhesive composition prepared in example 30. The fabric is then rolled between two aluminum sheets 50 micrometers thick as in example 52. The adhesion force is greater than the solidity of the metal sheet which is torn at the moment of the peeling tests.

Example 54

An E 1581 glass fabric is impregnated with the adhesive composition of example 33 to obtain after evaporation of the solvent an impregnated material containing 60% by weight of resin and 40% of glass fabric. This material is cut in square sheet 30 cm on a side. Twelve of these sheets are superposed and are placed between the plates of a hydraulic press heated to 120° C. A pressure of 1.4 MPa is applied and the temperature is brought to 170° C. The treatment under pressure at this temperature is 3 hours. The composite material is then annealed in an oven at 200° C. for 5 hours. It has an apparent porosity less than 2% and its ultimate bending strength is 60 kg/mm$^2$.

Example 55 (comparative)

The experimental conditions of example 54 are used to prepare a composite material with adhesive composition of example 22. The material obtained has an apparent porosity greater than 15% and it exhibits numerous swollen areas.

Example 56

This example is representative of the use of the polymers of the invention as adhesives supported on an E-235 glass fabric weighing 90 g per square meter and treated with a 3-aminopropyl triethoxysilane finish.

A copolyimide solution of example 5 (10 g), DEN 438 epoxy resin (1.2 g) and octyl epoxystearate (0.9 g) in a mixture of dichloromethane (22 g), xylene (3 g) and hexane (1 g) is used to coat the glass fabric stretched over a metal frame. The coated fabric is air-dried in an oven with forced ventilation for 15 to 20 minutes at 80°–90° C. At the end of the operation, the resin weight should be at least equal to the glass fabric weight but an excess of resin of 15 to 20% is still preferable.

The adhesive interlayer is placed between two 2024 T3 aluminum alloy test pieces with a covering surface of 3 cm$^2$. The assembly is subjected to a pressure of 0.5 MPa, then it is placed in an oven preheated to 120° C. After one hour of treatment at this temperature, it is brought to 200° C. and the assembly is annealed for 5 hours. After cooling at ambient temperature, the value of the tensile-shearing stress is 20.4 MPa.

Examples 57 to 60

A series of adhesive films supported on glass fabric as indicated in example 56 to glue aluminum alloy test pieces. The values of the tensile-shearing stress are given in table 8.

TABLE 8

| Example No. | Composition of example No. | Breaking Stress (MPa) |
|---|---|---|
| 57 | 26 | 20.5 |
| 58 | 28 | 20.2 |
| 59 | 31 | 21.2 |
| 60 | 33 | 22.3 |

We claim:

1. A method of gluing two substrates to one another, comprising placing an adhesive composition between the substrates and maintaining contact between the substrates while heating, wherein the adhesive composition comprises:
   (a) at least one copolyimide having ether chain formations produced by reacting at least one benzhydrol-3,3',4,4'-tetracarboxylic acid derivative or at least one benzophenone-3,3',4,4'-tetracarboxylic acid derivative, with at least one diamine selected from the group consisting of 2,2,4-trimethylhexamethylenediamine, 2,4,4-trimethylhexamethylenediamine and methylenedianiline and at least one additional diamine having ether functionality selected from the group consisting of bis(3-aminopropyl)polyoxytetramethylenes having a number of oxytetramethylene units of about 50 to 150, and
   (b) at least one epoxy resin possessing more than one epoxy group per molecule.

2. The method of claim 1, wherein the heating is performed at about 100° to 300° C.

3. The method of claim 1, wherein the heating is performed at about 100° to 200° C.

4. The method of claim 1, whrein the substrates are a polymer film and a thin metal sheet.

5. The method of claim 4, wherein the polymer film is a film produced from pyromellitic anhydride and 4,4'-oxydianiline.

6. The method of claim 4, wherein the metal is Cu or Al.

7. The method of claim 5, wherein the metal is Cu or Al.

8. The method of claim 1, wherein said at least one benzhydrol-3,3',4,4'-tetracarboxylic acid derivative is the methyl diester.

9. The method of claim 1, wherein said at least one benzophenone-3,3',4,4'-tetracarboxylic acid derivative is the dianhydride or the methyl diester.

10. A glued article produced by the method of claim 1.

11. A glued article produced by the method of claim 7.

* * * * *